United States Patent
Hashimoto et al.

(10) Patent No.: US 7,380,335 B2
(45) Date of Patent: Jun. 3, 2008

(54) STATOR MANUFACTURING DEVICE

(75) Inventors: Shingo Hashimoto, Anjo (JP); Tooru Kuroyanagi, Anjo (JP); Tsuyoshi Yamaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 257 days.

(21) Appl. No.: 10/560,775

(22) PCT Filed: Sep. 21, 2004

(86) PCT No.: PCT/JP2004/013729

§ 371 (c)(1),
(2), (4) Date: Dec. 14, 2005

(87) PCT Pub. No.: WO2005/029682

PCT Pub. Date: Mar. 31, 2005

(65) Prior Publication Data

US 2007/0101569 A1    May 10, 2007

(30) Foreign Application Priority Data

Sep. 24, 2003  (JP) ............................. 2003-332333

(51) Int. Cl.
  *B23P 19/00* (2006.01)
  *H02K 15/00* (2006.01)
(52) U.S. Cl. ..................... 29/732; 29/735; 29/596; 140/92.1; 242/433
(58) Field of Classification Search .......... 29/596–598, 29/732–736, 605–606; 310/179, 184, 260; 242/432.1, 432.2, 432.6, 433, 433.4; 74/23–24
See application file for complete search history.

(56) References Cited

U.S. PATENT DOCUMENTS

| 5,186,405 | A | * | 2/1993 | Beakes et al. ............... 242/432 |
| 5,549,253 | A | * | 8/1996 | Beakes et al. ............ 242/432.3 |
| 5,618,007 | A | * | 4/1997 | Beakes et al. ............ 242/432.6 |
| 5,657,530 | A | * | 8/1997 | Kawamura et al. ........... 29/596 |
| 5,946,792 | A | * | 9/1999 | Beakes ........................ 29/596 |
| 6,732,970 | B2 | * | 5/2004 | Dolgas et al. ............ 242/432.4 |
| 6,732,971 | B2 | * | 5/2004 | Stratico et al. ........... 242/432.6 |
| 7,011,266 | B2 | * | 3/2006 | Hashimoto et al. ....... 242/433.4 |

FOREIGN PATENT DOCUMENTS

| JP | A 60-245452 | 12/1985 |
| JP | A 11-289723 | 10/1999 |
| JP | A 2000-253631 | 9/2000 |
| JP | A 2003-153478 | 5/2003 |

* cited by examiner

*Primary Examiner*—Minh Trinh
(74) *Attorney, Agent, or Firm*—Oliff & Berridge, PLC

(57) ABSTRACT

A stator manufacturing device including a winding unit for forming a winding coil made up of a plurality of unipolar coils formed by winding wire, an insertion unit for receiving the winding coil from the winding unit and inserting the winding coil into a stator core, a shaping unit for shaping an outline of the winding coil that has been inserted into the stator core, and a transfer unit that is movable towards the insertion unit and the shaping unit, such that, in a state of holding the stator core, the transfer unit, by relatively moving to the insertion unit, moves the winding coil into a position for insertion into the stator core, and, by moving relative to the shaping unit, forms an outline of the winding coil.

8 Claims, 19 Drawing Sheets

F I G. 11
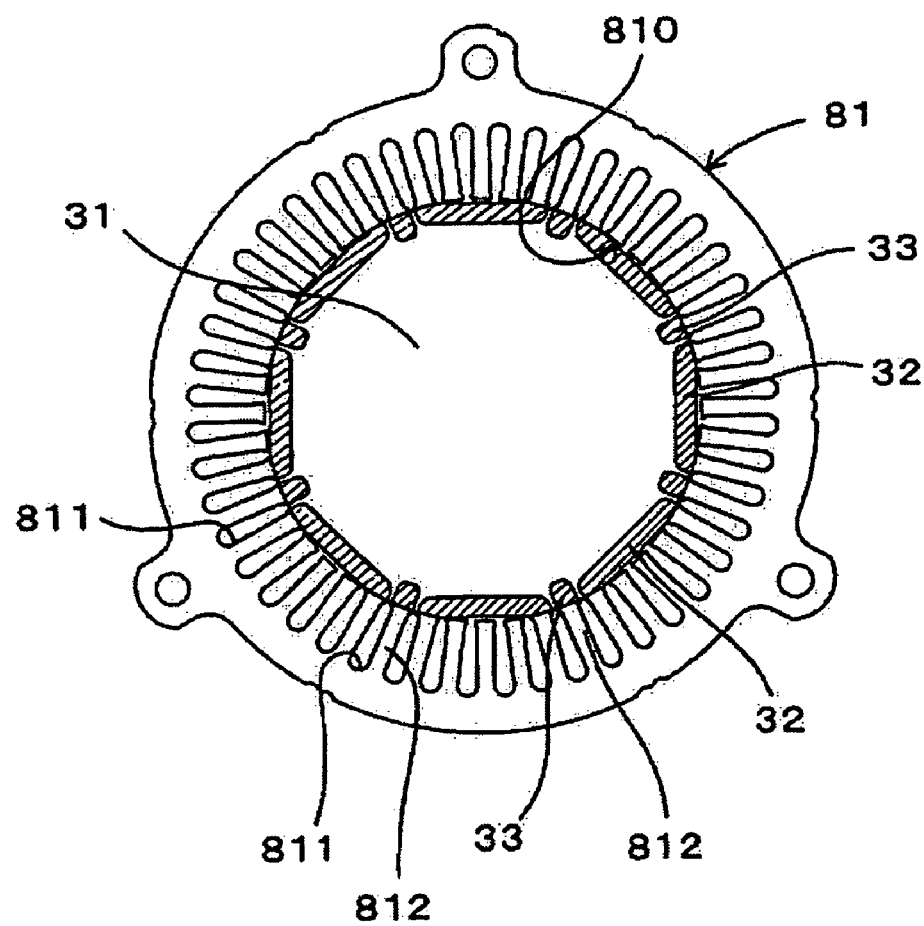

STATOR MANUFACTURING DEVICE

This application is the U.S. National Stage of PCT/JP2004/013729, filed Sep. 21, 2004, which claims priority from JP2003-332333, filed Sep. 24, 2003, the disclosures of which are incorporated herein in their entireties by reference thereto.

BACKGROUND

The disclosure relates to a stator manufacturing device for manufacturing a stator by arranging a winding coil, which is formed by winding wire, in a stator core.

In cases where a stator is formed by inserting a winding coil formed by winding wire into a slot formed in an inner peripheral face of a stator core, the winding coil is first formed in a winding jig. The winding coil is then temporarily shifted to an insertion jig and thereafter inserted so as to be positioned within the stator core. A winding device, as disclosed in Japanese Patent Application No. 2000-253631, includes a flyer, which is equivalent to the aforementioned winding jig, rotatable and able to supply the wire, a winding frame on which the wire is wound by the flyer, and a blade for receiving the wire wound on the winding frame. Then, a unipolar coil is formed by winding the wire by means of the flyer and the winding frame. The unipolar coil is sequentially dropped onto, i.e. received by, the blade so that a winding coil is formed by multiple unipolar coils. The blade that has received the winding coil is moved to a position facing a stator core, and a coil inserter, equivalent to the insertion jig, is moved so that the winding coil is inserted so as to be positioned within the stator core.

SUMMARY

According to the above-described winding device, however, the blade holding the winding coil is moved to a position facing the stator core after the winding coil is formed. Therefore, although the blade moves to a position facing the stator core so that the winding coil is inserted so as to be positioned within the stator core, and then returns to a position facing the flyer and the winding frame, a new winding coil, i.e. a winding coil that is next to be inserted into the stator coil, cannot be formed. A standby time during which the flyer and the winding frame do not operate becomes long, and thus is not satisfactory in terms of reducing the time for manufacturing a stator.

The disclosure addresses the above circumstances by providing a stator manufacturing device that can bring a winding coil, to be inserted into a stator core and to be shaped, and, at the same time, bring a new winding coil, which is next to be inserted into the stator core, to be formed.

According to one aspect, a stator manufacturing device including a winding unit for forming a winding coil made up of a plurality of unipolar coils formed by winding wire, an insertion unit for receiving the winding coil from the winding unit and inserting the winding coil into a stator core, a shaping unit for shaping an outline of the winding coil that has been inserted into the stator core, and a transfer unit that is movable towards the insertion unit and the shaping unit, wherein, in a state of holding the stator core, the transfer unit, by moving relative to the insertion unit, moves the winding coil into a position for insertion into the stator core, and, by moving relative to the shaping unit, forms an outline of the winding coil.

The stator manufacturing device includes the winding unit, the insertion unit, and the shaping unit formed into a single unit. In addition, the stator manufacturing device includes the transfer unit that is movable towards the insertion unit and the shaping unit. Thus, the winding coil can be formed and then the outline of the winding coil positioned within the stator core can be shaped consistently in the stator manufacturing device. The space required for installing the stator manufacturing device can be reduced in comparison with cases where the aforementioned units are separately installed.

Further, with the stator manufacturing device, the stator core is moved by the transfer unit so as to face the insertion unit and the shaping unit. Then, the winding coil is inserted into the stator core by a relative movement between the transfer unit and the insertion unit. In the same way, the winding coil positioned within the stator core is shaped by a relative movement between the transfer unit and the shaping unit.

As a result, with the stator manufacturing device, first, the winding coil consisting of multiple unipolar coils, formed by winding a wire, is formed in the winding unit. Then, the winding coil formed by multiple unipolar coils is passed from the winding unit to the insertion unit by means of a relative movement between the winding unit and the insertion unit. While the winding coil is being formed or passed, the transfer unit can be in a standby state while holding the stator core.

Next, the transfer unit holding the stator core is moved towards the insertion unit that holds the winding coil. The transfer unit and the insertion unit are moved relative to each other so that the stator core, held at the insertion unit, is inserted into the stator core held at the transfer unit. Then, the transfer unit and the insertion unit are again moved relative to each other in such a way that the transfer unit in which the stator core has received the winding coil is moved towards the shaping unit.

Accordingly, the winding unit can form, independently and separately from the insertion unit, the winding coil formed by multiple unipolar coils. In addition, the insertion unit can receive the winding coil from the winding unit, and thereafter, by operating with the transfer unit, cause the winding coil to be inserted into the stator core. Therefore, after the winding coil has been handed over to the insertion unit from the winding unit, by means of the transfer unit and the insertion unit, even while the winding coil is inserted to be positioned within the stator core, the winding unit can start forming a new winding coil that is to be next inserted into the stator core.

Next, the transfer unit holding the stator core, within which the winding coil is positioned, is moved towards the shaping unit, and the outline of the winding coil positioned within the stator core is shaped by a relative movement between the transfer unit and the shaping unit. Even while the transfer unit is moving, the winding unit can keep forming a new winding coil to be next inserted into the stator core, and the outline of the winding coil positioned within the stator core is shaped by means of the transfer unit and the shaping unit.

Therefore, with the stator manufacturing device, insertion of the winding coil into the stator core and shaping of the outline of the winding coil positioned within the stator core, and forming of a new winding coil, which is to be next inserted into the stator core, are simultaneously performed. As a result, the time required for manufacturing the stator can be reduced accordingly.

After the shaping of the outline of the winding coil is completed, the transfer unit can be moved towards the insertion unit while holding the stator core and, by a relative movement to the insertion unit, receive the winding coil. Then, depending on a specification of the stator to be formed, the winding coil can be repeatedly formed in the winding unit. The transfer unit can operate with the insertion unit and the shaping unit for repeatedly performing the insertion of the winding coil into the stator core and for shaping the outline of the winding coil.

BRIEF DESCRIPTION OF DRAWINGS

The disclosure will be made with reference to the drawings, in which:

FIG. 11 is a plan view showing a state in which coil receiving portions of the insertion unit face slots formed on the stator core held at the transfer unit;

DESCRIPTION OF THE PREFERRED EMBODIMENT

A preferred embodiment is described below. According to the stator manufacturing device, by repeating the forming, inserting, and shaping of the winding coil as required, a stator for a three-phase motor, which is obtained by the winding coil of a U-phase, a V-phase, and a W-phase positioned within the stator core, can be manufactured within a short period of time.

In addition, when the winding coil is moved into a position for insertion into the stator core, the transfer unit, in a state of holding the stator core, is preferably structured to approach the insertion unit in a state where the insertion unit is holding the winding coil. In these circumstances, the position for inserting the winding coil into the stator core can be established by first fixing the insertion unit, and by then causing the transfer unit holding the stator core to approach. Thus, a structure of the stator manufacturing device can be simplified.

Further, in a state of holding the stator core, the transfer unit is preferably structured to approach the shaping unit at a time when the outline of the winding coil is being shaped. In these circumstances, shaping of the outline of the winding coil can be undertaken by first fixing the insertion unit, and by then causing the transfer unit holding the stator core to approach. Thus, the structure of the stator manufacturing device is also simplified.

Furthermore, the transfer unit includes a holding portion for holding the stator core and a swing arm for rotating the holding portion relative to a swing center axis. The insertion unit and the shaping unit are preferably arranged facing one another on a swing locus of the holding portion. In these circumstances, the transfer unit can move the stator core, held at the holding portion, to a position facing the insertion unit, and, by rotating the swing arm, also to a position facing the shaping unit. Therefore, the stator manufacturing device can be downsized and the structure thereof further simplified.

Furthermore, the winding unit preferably includes multiple coil winding frames, each coil winding frame for forming a unipolar coil formed by winding wire and each coil winding frame movably provided on a base holder. One of the multiple coil winding frames is made so as to protrude from the other of the coil winding frames, and an entire winding unit is rotated relative to the protruding coil winding frame so that the unipolar coil is subsequently formed. In this case, a winding unit that can independently form the winding coil is easily provided separately from the insertion unit. Therefore, a structure of the stator manufacturing device can be further simplified. In addition, in this case, the unipolar coil can be subsequently formed on each coil winding frame by subsequently moving each coil winding frame for winding wire and making the coil winding frame protrude from the remaining coil winding frames so that a winding coil formed by multiple unipolar coils is formed.

Figure 1:
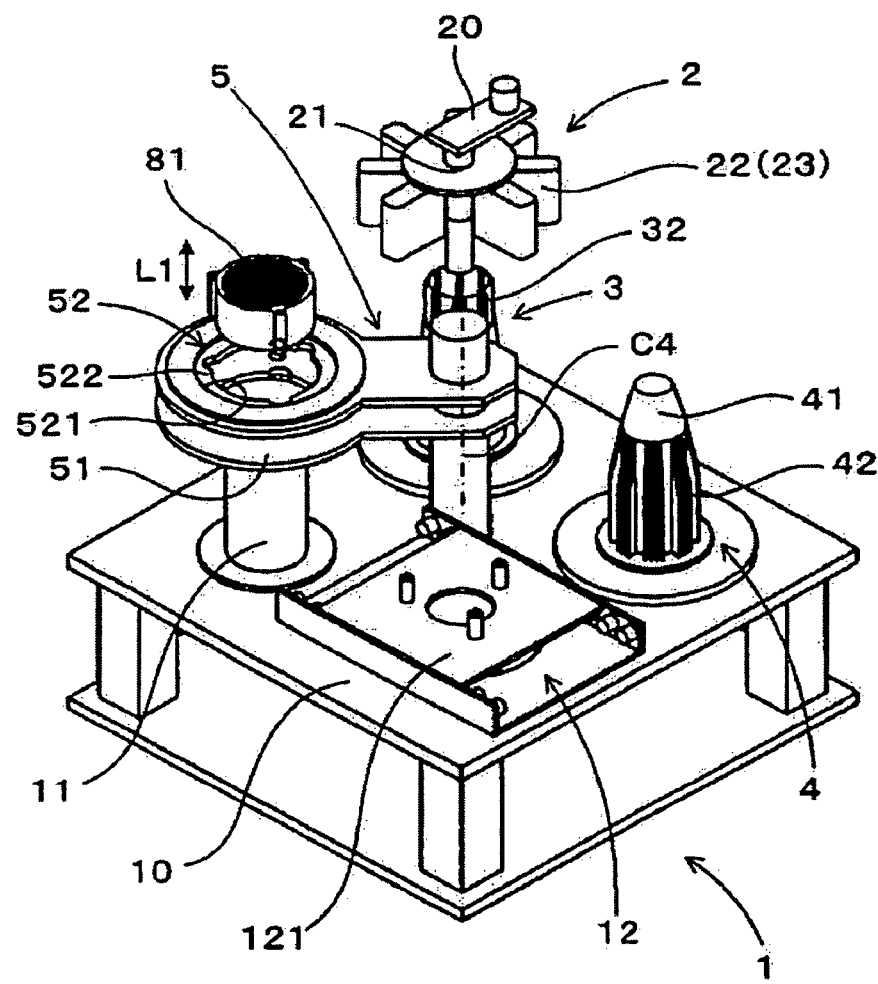
FIG. 1 is a perspective view of a stator manufacturing device according to an exemplary embodiment.
Figure 2:
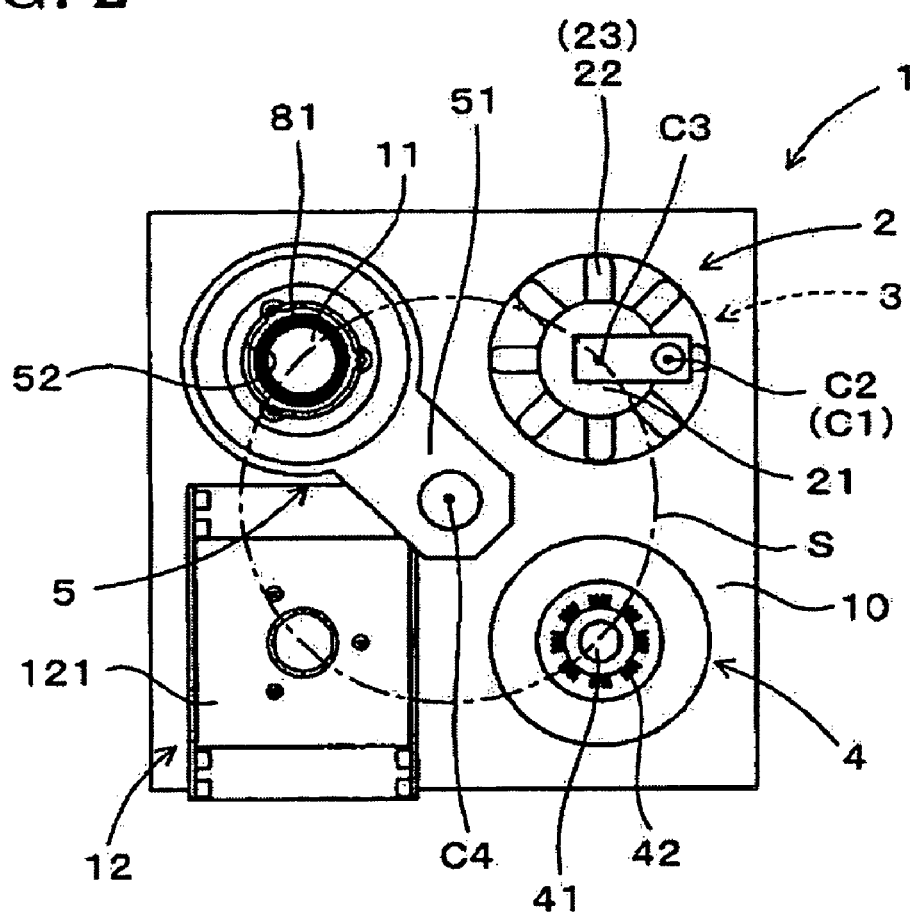
FIG. 2 is a plane view of the stator manufacturing device according to the exemplary embodiment.

As shown in FIGS. 1 and 2, a stator manufacturing device 1, according to the exemplary embodiment, includes a winding unit 2 for forming a winding coil 9 consisting of multiple unipolar coils 91 each formed by the winding of wire 90, an insertion unit 3 for receiving the winding coil 9 from the winding unit 2 and inserting the winding coil 9 into a stator core 81, a shaping unit 4 for shaping an outline of the winding coil 9 positioned within the stator core 81, and a transfer unit 5 movable to the insertion unit 3 and the shaping unit 4. The transfer unit 5, with the stator core 81 held thereat, moves relative to the insertion unit 3 so as to bring the winding coil 9 to a position for insertion into the stator core 81. In addition, the transfer unit 5, with the stator core 81 held thereat, moves relative to the shaping unit 4 so as to shape the outline of the winding coil 9. A detailed explanation follows.

As shown in FIGS. 1 and 2, the transfer unit 5 can carry the stator core 81 to the insertion unit 3 and the shaping unit 4. The transfer unit 5 includes a holding portion 52 for holding the stator core 81, and a swing arm 51 for rotating the holding portion 52 relative to a swing center axis C4. Further, the transfer unit 5 includes a swing device (not shown) for rotating the swing arm 51. The insertion unit 3 and the shaping unit 4 are arranged so as to face one another on a swing locus S of the holding portion 52. By operating the swing device for rotating the swing arm 51, the transfer unit 5 can carry the stator core 81 held by the holding portion 52 to a position facing the insertion unit 3. The transfer unit 5 can also carry the stator core 81 to a position facing the shaping unit 4.

Further, as shown in FIGS. 1 and 2, the holding portion 52 is structured to hold an outer peripheral face of the stator core 81. The holding portion 52 includes a holding hole 521, formed on the swing arm 51, and a clamp 522 movable in such a way that a size of the holding hole 521 is decreased. When the stator core 81 is inserted and positioned within the holding hole 521, the holding portion 52 can hold the stator core 81 in the holding hole 521 by operating the clamp 522.

Furthermore, as shown in FIGS. 1 and 2, the transfer unit 5 can not only rotate the holding portion 52 relative to the swing center axis C4 but can also move the holding portion 52 in an axial direction L1 thereof In other words, the swing arm 51 is rotatable, and slidable in the axial direction L1, for the holding portion 52. In a case where the winding coil 9 is inserted and positioned within the stator core 81, the swing arm 51 with the stator core 81 held thereat approaches the insertion unit 3 that holds the winding coil 9. In addition, when the outline of the winding coil 9 is shaped, the transfer unit 5, with the stator core 81 held thereat, approaches the shaping unit 4.

According to the stator manufacturing device 1, the winding unit 2, the insertion unit 3, the shaping unit 4, and the transfer unit 5 are respectively arranged on a mounting 10. The stator manufacturing device 1 further includes a platform 11 where the stator core 81, into which the winding coil 9 has not yet been inserted, can be mounted, and a transfer conveyer 12 for transporting a stator 8, within which the winding coil 9 is positioned and shaped, to the outside of the stator manufacturing device 1. The transfer conveyer 12 includes a pallet 121 capable of accommodating and transporting the stator 8 manufactured in the stator manufacturing device 1.

The transfer unit 5 receives the stator core 81 in the holding portion 52 in a state in which the holding portion 52 is moved to face the platform 11. The transfer unit 5 also transports the stator 8, held at the holding portion 52, from the insertion unit 3, or the shaping unit 4, to the transfer conveyer 12.

According to the exemplary embodiment, the swing center axis C4 of the transfer unit 5 is arranged on a substantially center portion of the mounting 10. The platform 11, the winding unit 2, the insertion unit 3, the shaping unit 4, and the transfer conveyer 12 are arranged around the swing center axis C4. By rotation of the swing arm 51 relative to the swing center axis C4, the stator core 81, held at the holding portion 52, is transported to respective positions facing the platform 11, the winding unit 2, the insertion unit 3, the shaping unit 4, and the transfer conveyer 12.

Figure 3:
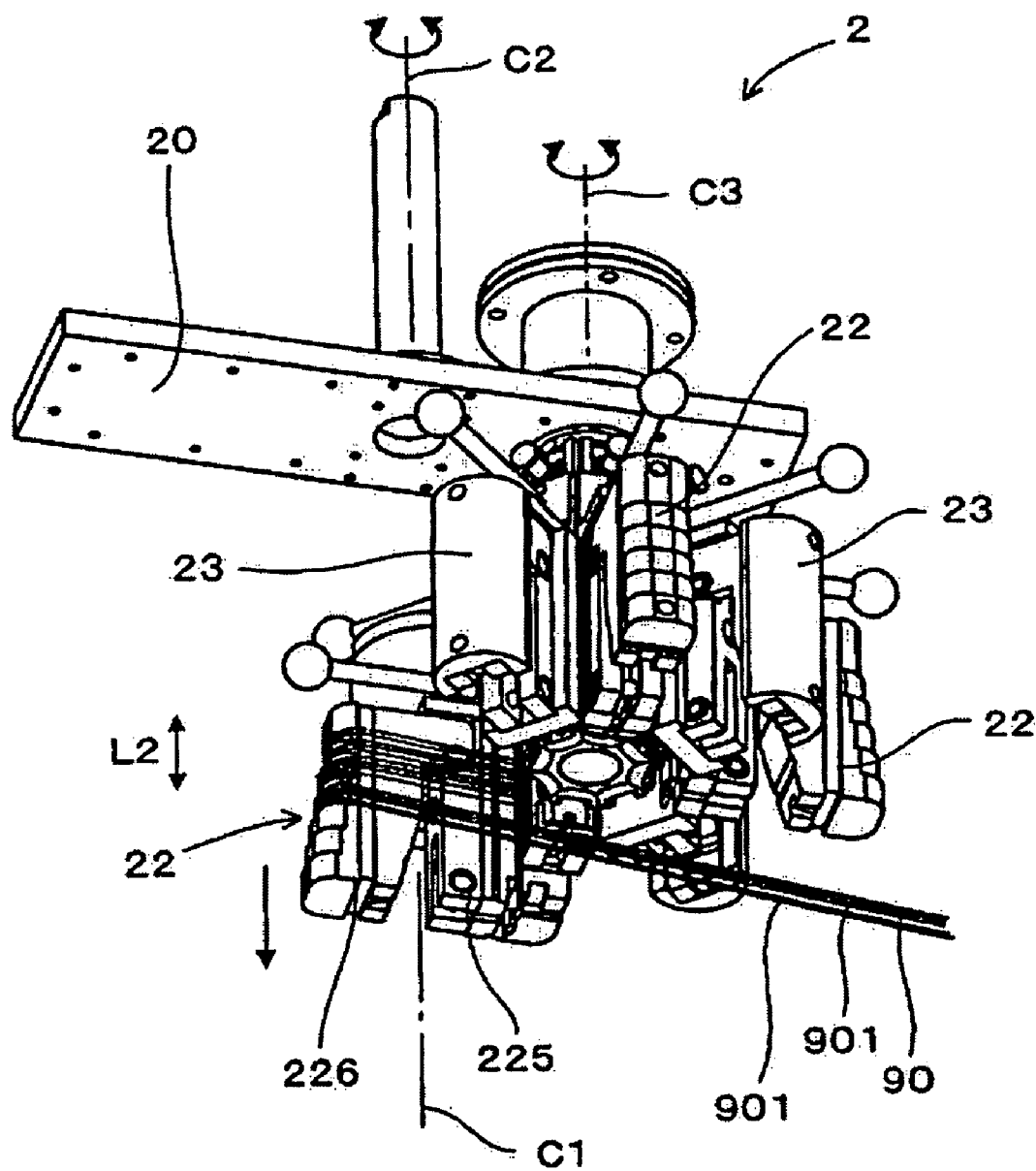
FIG. 3 is a perspective view of a winding unit according to the exemplary embodiment.
Figure 4:
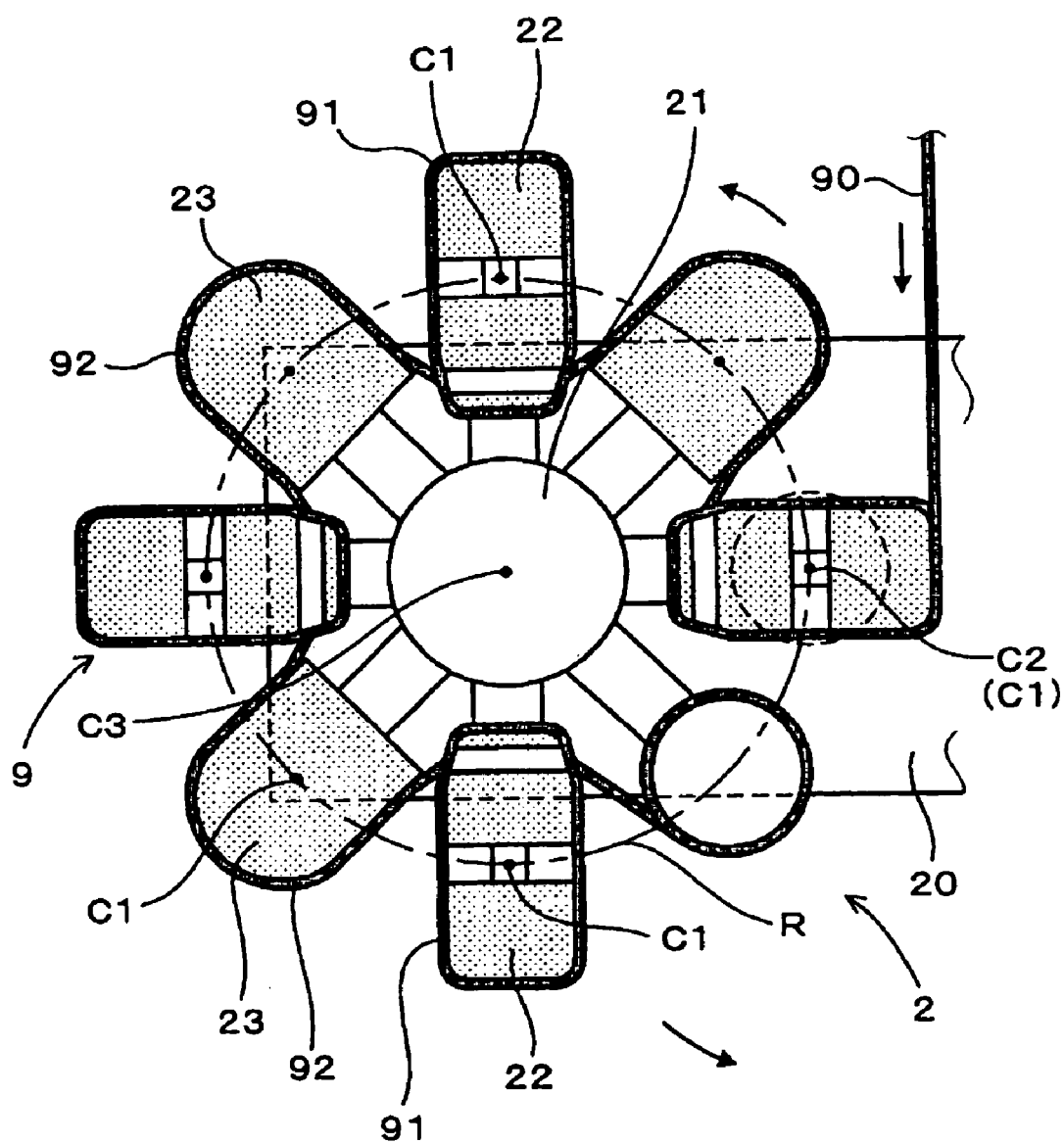
FIG. 4 is a plan view showing a state in which a winding coil is formed in the winding unit according to the exemplary embodiment.

As shown in FIGS. 3 and 4, the winding unit 2 includes a base holder 21 and multiple coil winding frames 22, each coil winding frame 22 provided so as to be movable in a direction L2, relative to the base holder 21. That is, each coil winding frame 22 is able to approach, or move away from, the base holder 21. The coil winding frame 22 is provided for forming a unipolar coil 91, by the winding of wire 90. In addition, multiple crossover winding frames 23 are respectively arranged between the coil winding frames 22 so as to connect the unipolar coils 91 to each other. Each crossover winding frame 23 is also movable in a direction approaching, or moving away from, the base holder 21.

The winding unit 2 forms a unipolar coil 91 such that one of the coil winding frames 22 is made to protrude away from the remaining coil winding frames 22 and the crossover winding frames 23. Thus, the unipolar coil 91 is formed by rotation of the entire winding unit 2 relative to the protruding coil winding frame 22. The respective coil winding frames 22 for winding the wire 90 are sequentially moved in the direction L2 and made to protrude away from the remaining coil winding frames 22 and the crossover winding frames 23. Thus, the unipolar coils 91 are sequentially formed on the respective coil winding frames 22 so that a winding coil 9, consisting of multiple unipolar coils 91, can be formed.

As shown in FIGS. 3 and 4, the base holder 21 is movable relative to a swing base 20 arranged so as to be rotatable relative to a swing base center axis C2. The coil winding frames 22 and the crossover winding frames 23 are arranged on the base holder 21 such that respective winding axes C1 of the coil winding frames 22 and the crossover winding frames 23 are substantially in parallel to each other. At the same time, the respective winding axes C1 are substantially in parallel to the swing base center axis C2. The base holder 21 is structured such that the respective coil winding frames 22 for winding the wire 90 subsequently approach the swing base center axis C2.

As shown in FIGS. 3 and 4, the base holder 21 is arranged so as to be rotatable relative to a rotary center axis C3, which is formed in an offset position from the swing base center axis C2 such that the rotary center axis C3 and the swing base center axis C2 are substantially parallel to one another. The respective coil winding frames 22 and the crossover winding frames 23 are provided on the base holder 21 such that the respective winding axes C1 of the coil winding frames 22 and the crossover winding frames 23 are arranged on a virtual circle R represented with reference to the rotary center axis C3, as shown in FIG. 4. By rotating the base holder 21 by a predetermined angle, the respective coil winding frames 22 and the crossover winding frames 23 for winding the wire 90 are subsequently brought substantially to the swing base center axis C2 so that the winding axis C1 of each coil winding frame 22, or of each crossover winding frame 23, to all intents and purposes, substantially coincides with the swing base center axis C2.

As shown in FIG. 3, each coil winding frame 22 includes an inside winding frame portion 225 assembled to the base holder 21, and an outside winding frame portion 226 provided so as to face the inside winding frame portion 225. The outside winding frame portion 226 is movable between a winding position P1, shown in FIG. 7, in which wire 90 has been wound, and a separation position P2, shown in FIG. 8, in which a unipolar coil 91 formed by the winding of wire 90 is separated from the coil winding frame 22, so that a distance between the outside winding frame portion 226 and the inside winding frame portion 225 is reduced.

Figure 7:
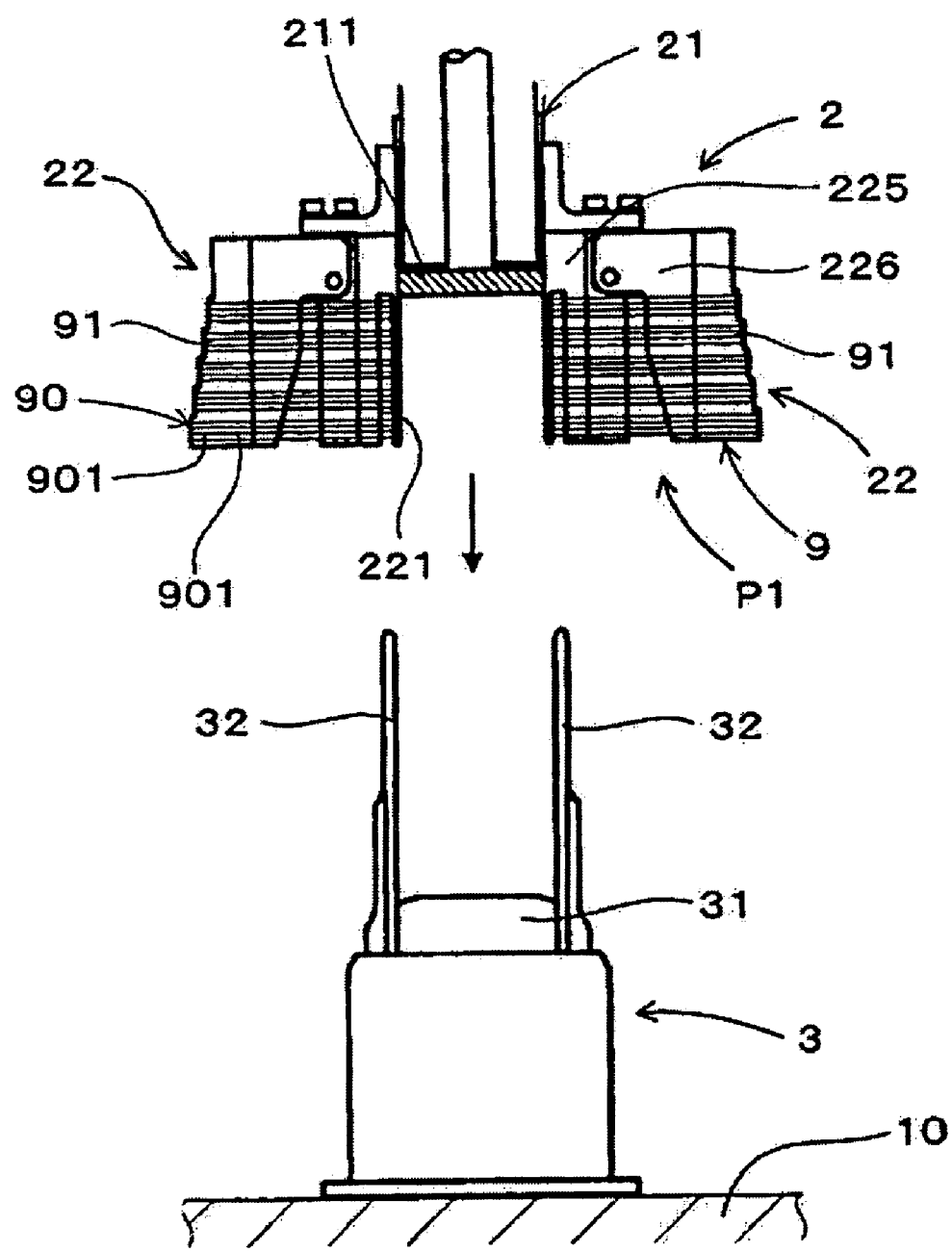
FIG. 7 is a side view showing a state before the winding unit holding the winding coil is brought close to the insertion unit.
Figure 8:
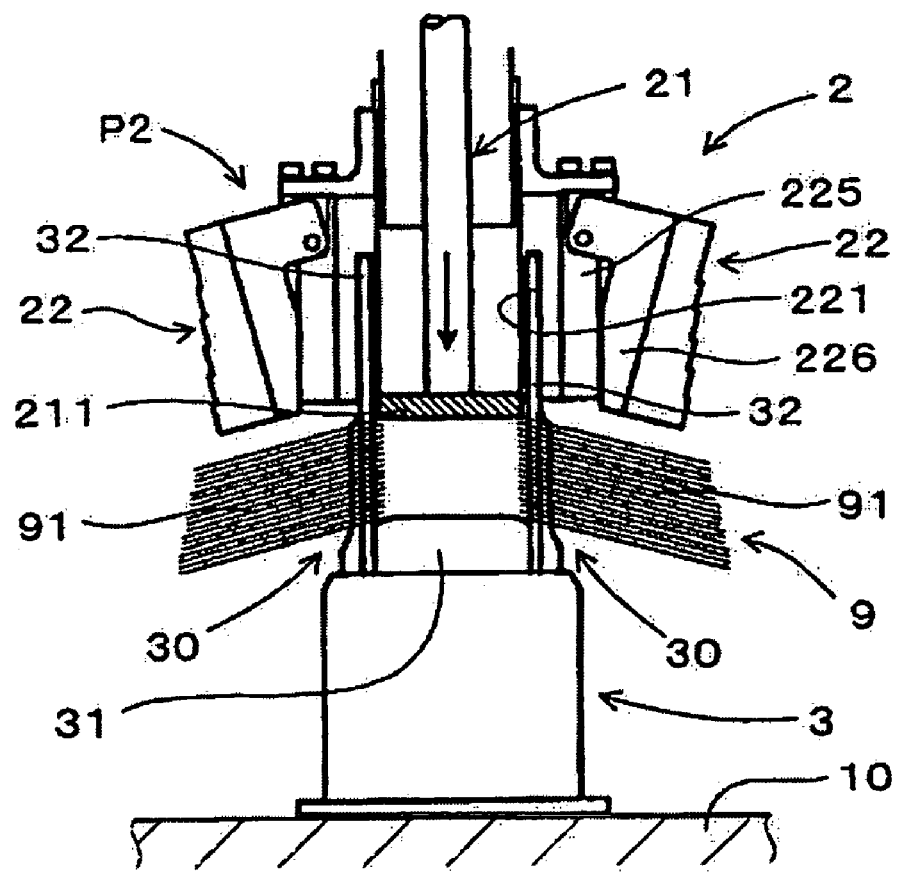
FIG. 8 is a side view showing a state in which the winding unit holding the winding coil has been made to approach the insertion unit and been handed over to the insertion unit.
Figure 9:
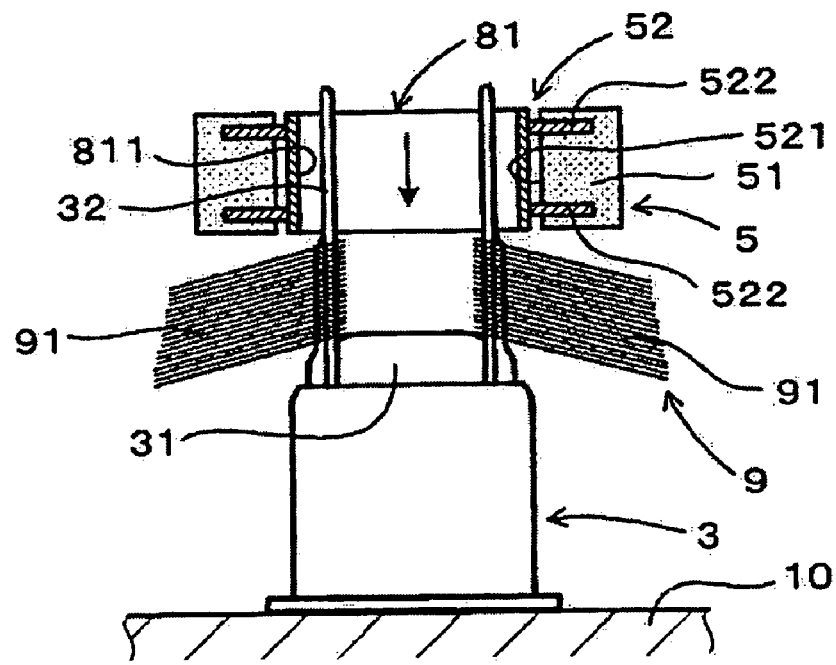
FIG. 9 is a side view showing a state in which a transfer unit holding a stator core is made to approach the insertion unit holding the winding coil.
Figure 10:
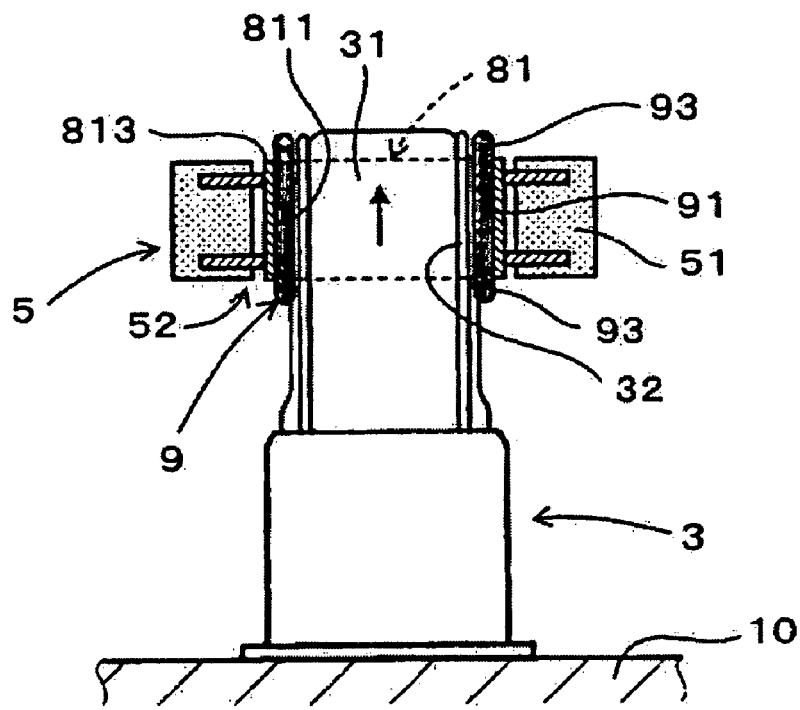
FIG. 10 is a side view showing a state in which the winding coil is shifted from the insertion unit to be positioned within the stator core held at the transfer unit.

The insertion unit 3, FIGS. 7-10, includes a pushing insertion core 31, for pushing the winding coil 9 into a position for insertion into slots 811 formed in a stator hole 810 (FIG. 11) of the stator core 81, as shown in FIGS. 9 and 10, and multiple coil receiving portions 32 formed on an outer peripheral face of the pushing insertion core 31, and receiving unipolar coils 91 from each coil winding frame 22, as shown in FIGS. 7 and 8.

Figure 6:
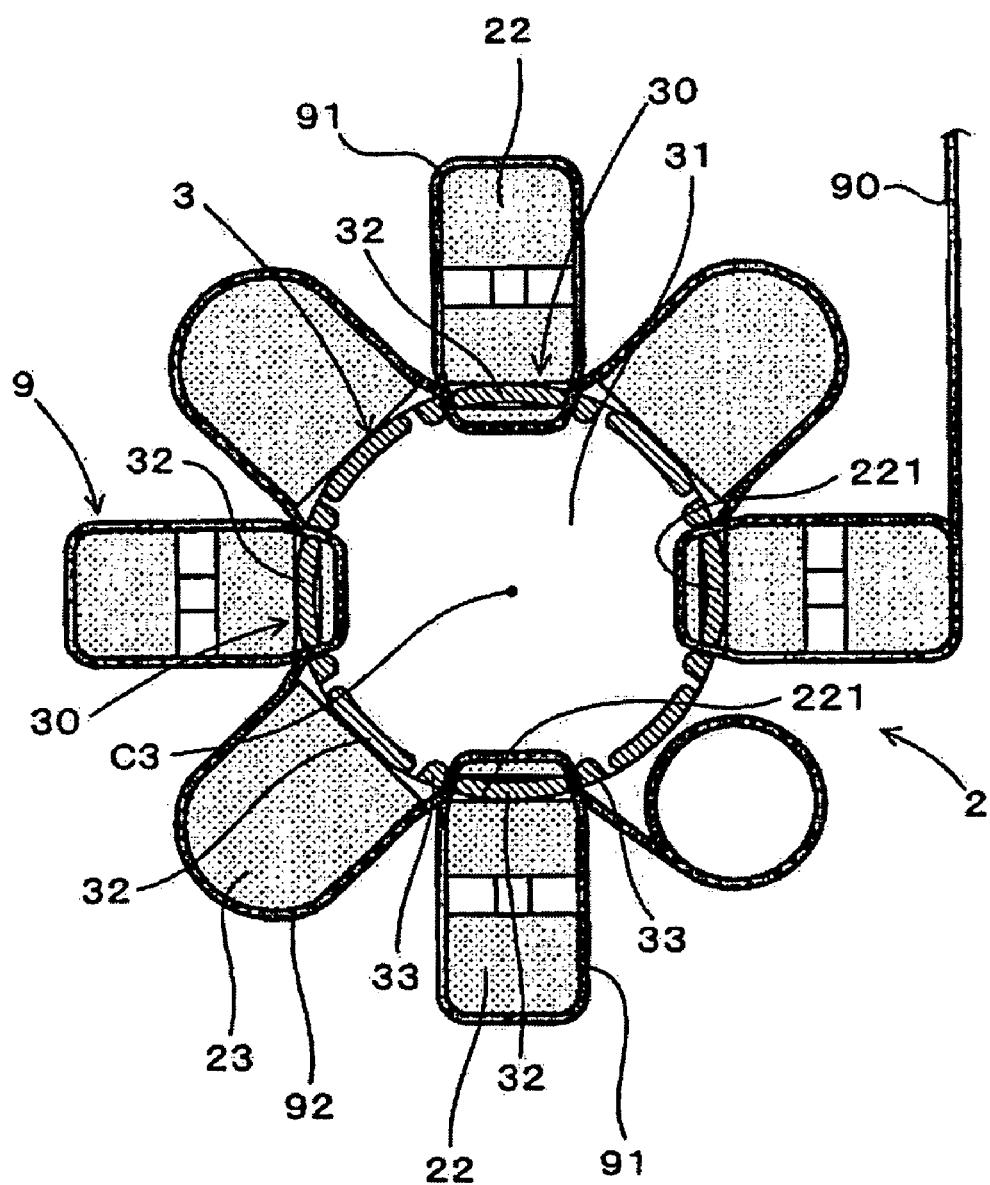
FIG. 6 is a plan view showing a state in which the winding unit holding the winding coil is made to approach an insertion unit.

As shown in FIG. 6, multiple guiding portions 33 are respectively arranged between the coil receiving portions 32 in such a way that each guiding portion 33 is formed in a direction substantially identical to that in which the coil receiving portion 32 is formed. The respective guiding portions 33, as shown in FIG. 11, face teeth 812 that are respectively formed between the slots 811 of the stator core 81, so as to guide each unipolar coil 91 of the winding coil 9 into a position for insertion into the slots 811. Further, by a single movement relative to the winding unit 2, the insertion unit 3 can receive the winding coil 9 formed in the winding unit 2 consisting of multiple unipolar coils 91.

As shown in FIGS. 7 and 8, according to the exemplary embodiment, the winding unit 2 and the insertion unit 3 are provided so as to face one another in the stator manufacturing device 1. In addition, the winding unit 2 is movable relative to the insertion unit 3. When the winding unit 2 is made to approach the insertion unit 3, and the outside winding frame portion 226 is moved from the winding position P1 to the separation position P2, the winding coil 9 can be accepted from the winding unit 2 onto the insertion unit 3.

Figure 12:
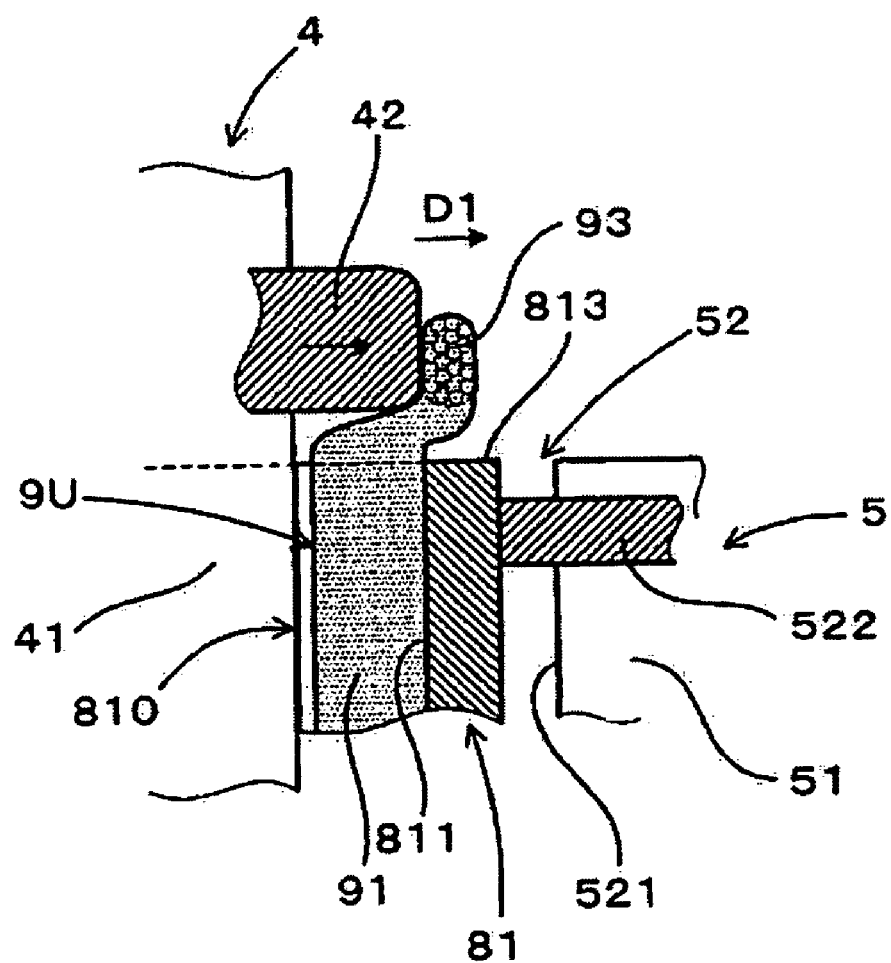
FIG. 12 is a side view showing a state in which a shaping unit shapes the winding coil positioned within the stator core held at the transfer unit.
Figure 13:
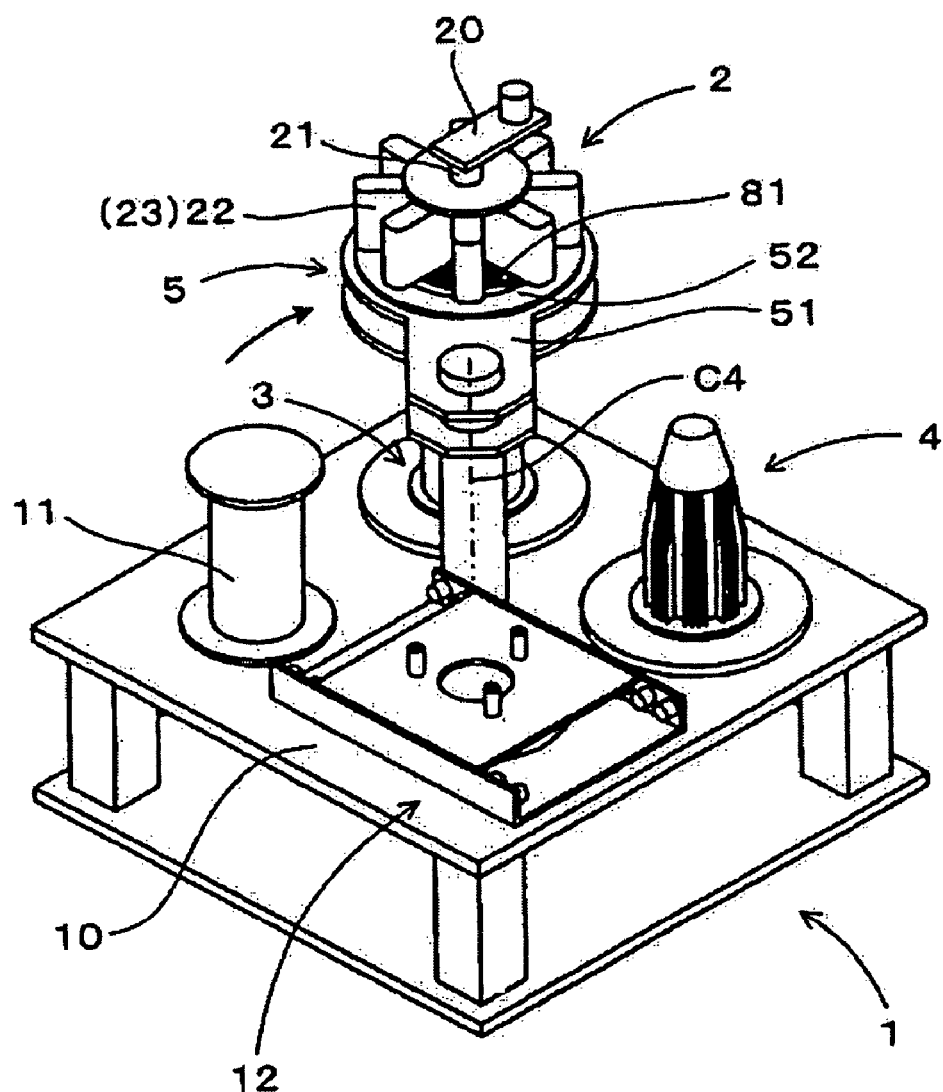
FIG. 13 is a perspective view of the stator manufacturing device in a state in which the transfer unit has moved to a position facing the insertion unit.
Figure 14:
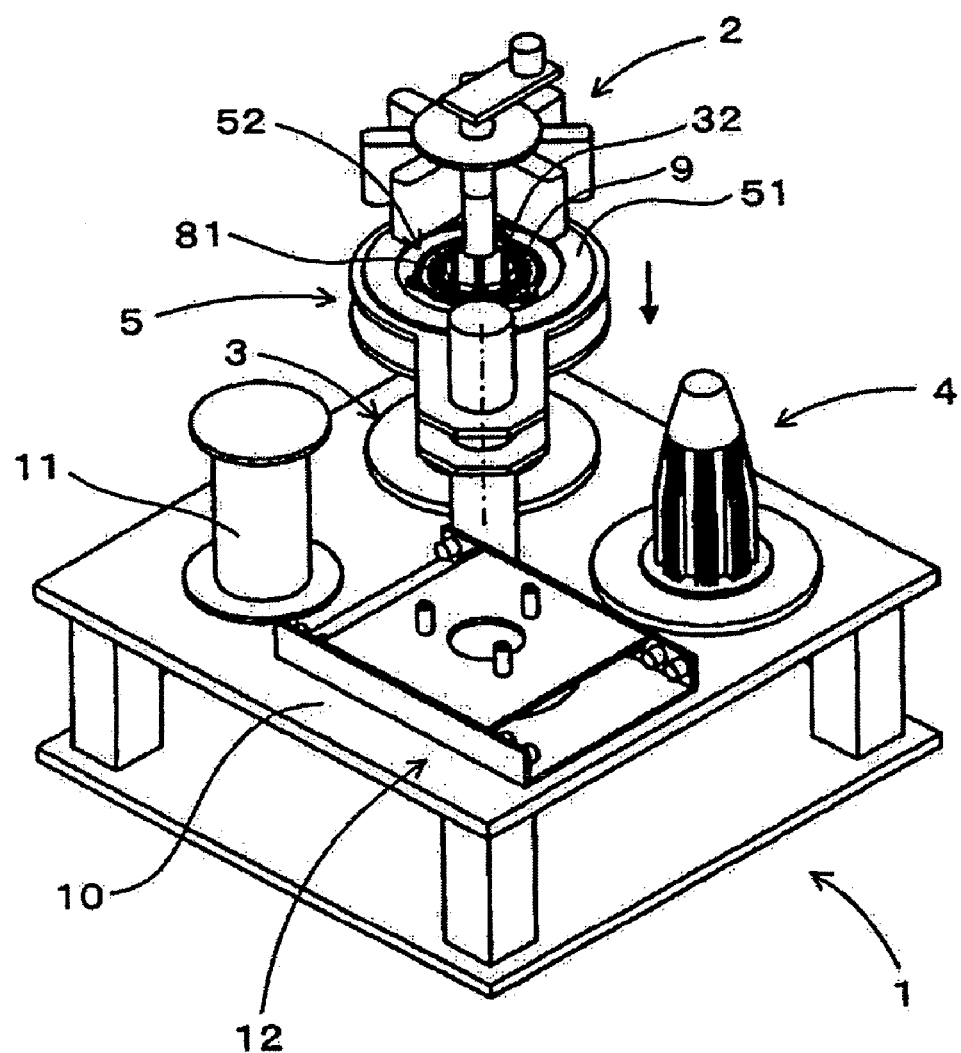
FIG. 14 is a perspective view of the stator manufacturing device in a state in which the transfer unit is made to approach the insertion unit.

The shaping unit 4 includes a main body portion 41 to be inserted into the stator hole 810 (see FIG. 11) of the stator core 81, and movable shaping portion 42 that, by moving in an outer peripheral direction D1 of the main body portion 41, as shown in FIG. 12, shapes the outline of the winding coil 9 positioned within the stator core 81. In a case where the transfer unit 5 approaches the shaping unit 4, and then the main body portion 41 of the shaping unit 4 is inserted into the stator hole 810 of the stator core 81, the winding coil 9 positioned within the stator core 81 can be shaped by moving the movable shaping portion 42 in the outer peripheral direction D1 of the main body portion 41. The stator hole 810 is a hole used when a rotor is provided for the stator 8.

As shown in FIG. 10, in the case where the winding coil 9 is inserted into the stator core 81, a part of the unipolar coil 91 of the winding coil 9 protrudes from each axial end portion 813 of the stator core 81 and forms a coil end portion 93. Then, as shown in FIG. 12, in a shaping process for the winding coil 9 in which the transfer unit 5 and the shaping unit 4 are used, each coil end portion 93 is shaped so as to be deformed and move in the outer peripheral direction D1 of the stator core 81.

Figure 5:
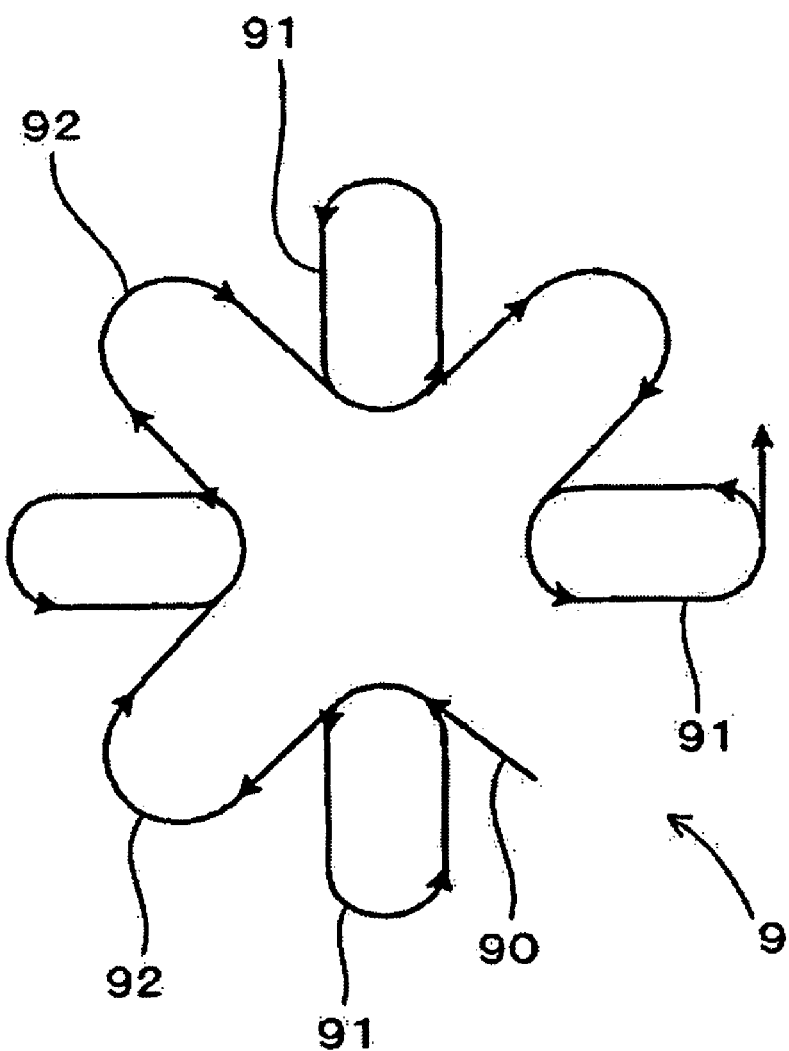
FIG. 5 is a view of the winding coil formed by multiple unipolar coils according to the exemplary embodiment.

Next, an explanation follows of a method for manufacturing the stator 8 by providing the winding coil 9 within the stator core 81 according to the aforementioned stator manufacturing device 1. According to the exemplary embodiment, the stator 8 is formed through a winding process, a handing process, an inserting process, and a shaping process. First, in the winding process, as shown in FIG. 5, by use of the winding unit 2, the winding coil 9 made up of multiple unipolar coils 91 is formed by winding wire 90 into a loop shape. In the winding process, as shown in FIGS. 3 and 4, the base holder 21 is rotated at a predetermined angle relative to the rotary center axis C3 so that the winding axis C1 of the coil winding frame 22, or of the crossover winding frame 23, which is used for winding the wire 90, substantially coincides with the swing base center axis C2.

Then, as shown in FIG. 3, the coil winding frame 22, or the crossover winding frame 23, used for winding the wire 90 is made to protrude away from the remaining coil winding frames 22 and the crossover winding frames 23. When the swing base 20 is rotated relative to the swing base center axis C2, the entire winding unit 2 can be rotated relative to the winding axis C1 of the protruding coil winding frame 22, or of the crossover winding frame 23. Thus, the wire 90 is wound on the protruding coil winding frame 22 or on the crossover winding frame 23, thereby forming a unipolar coil 91, or a crossover wire 92. In the same way, as shown in FIG. 4, a unipolar coil 91, or a crossover wire 92, is formed on the respective remaining coil winding frames 22 and the crossover winding frames 23 so that a winding coil 9 formed by unipolar coils 92 connected to one another by the respective crossover wires 92 is produced (see FIG. 5).

Next, in the handing process, as shown in FIGS. 6 to 8, the winding coil 9 formed by the winding unit 2 is handed over to the insertion unit 3. In this handing process, as shown in FIGS. 7 and 8, the winding unit 2 is made to approach the insertion unit 3 so that each coil receiving portion 32 is inserted into a recess portion 221 formed so as to extend in the winding axis direction C1 of each coil winding frame 22 in the winding unit 2. Then, as shown in FIGS. 6 and 8, each of the coil winding frames 22 is connected to its corresponding coil receiving portion 32 so as to form a handover route 30 for handing over each of the unipolar coils 91.

In the aforementioned state, the outside winding frame portion 226 of each coil winding frame 22 is moved from the winding position P1 to the separation position P2. At the same time, a pushing core 211, movably provided within the base holder 21, is moved in the direction of the arrow in FIG. 8, thereby enabling the handing over of the winding coil 9, held at the coil winding frame 22, to the coil receiving portion 32 of the insertion unit 3. In addition, during the winding process and the handing process of the winding coil 9, as shown in FIG. 1, the holding portion 52 of the transfer unit 5 is moved to a position facing the platform 11. With the stator 81 held at the holding portion 52, the transfer unit 5 is kept on standby.

Next, in the inserting process, the winding coil 9, held at the insertion unit 3, is inserted into and positioned within the stator core 81, that is held by the transfer unit 5, as shown in FIGS. 9 to 11, 13, and 14. In the inserting process, the holding portion 52 of the transfer unit 5 is moved to a position facing the insertion unit 3 and then the swing arm 51 is made to approach the insertion unit 3.

Then, as shown in FIGS. 9 and 11, the coil receiving portions 32 of the insertion unit 3 are respectively inserted into the stator holes 810 of the stator core 81 that is held at the holding portion 52 of the transfer unit 5. As shown in FIG. 10, the pushing insertion core 31 of the insertion unit 3 is made to approach the stator core 81 so that each unipolar coil 91 held at the coil receiving portion 32 is inserted into the slots 811 of the stator core 81 held at the holding portion 52 of the transfer unit 5. The winding coil 9 is accordingly inserted into the stator core 81 from the insertion unit 3. Further, after the winding coil 9 is positioned within the stator core 81, the coil end portions 93 are formed by parts of the unipolar coil 91 of the winding coil 9 that protrude from the axial end portions 813 of the stator core 81.

Figure 15:
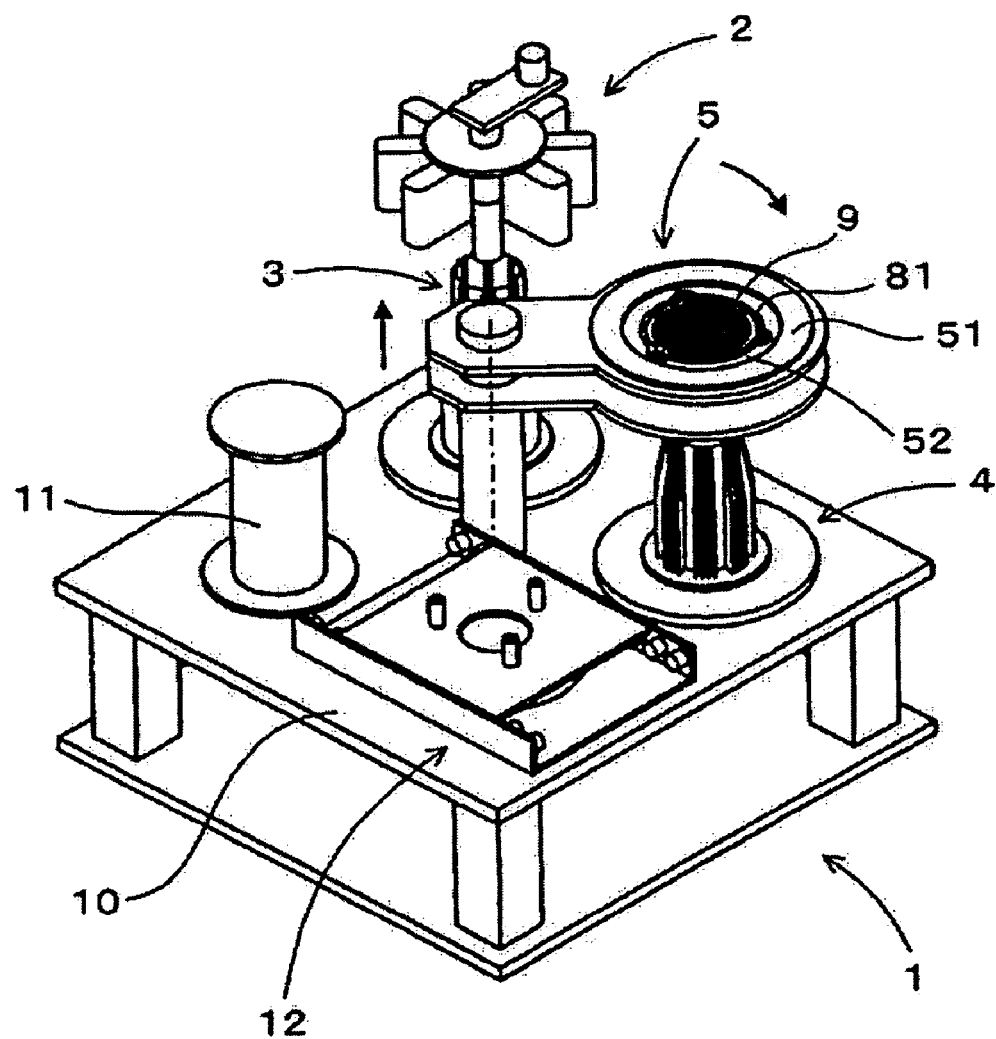
FIG. 15 is a perspective view of the stator manufacturing device in a state in which the transfer unit has moved from the position facing the insertion unit to a position facing the shaping unit.
Figure 16:
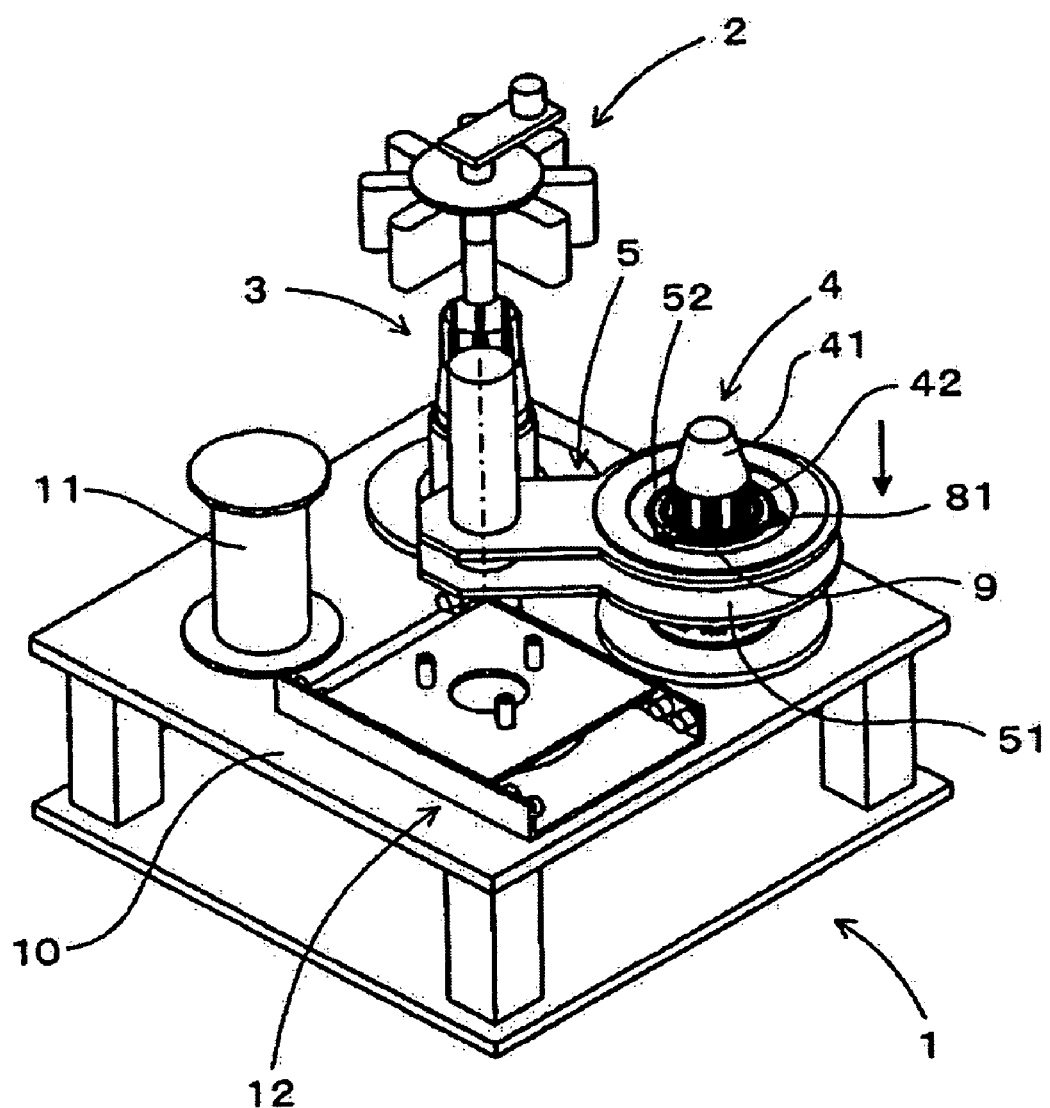
FIG. 16 is a perspective view of the stator manufacturing device in a state in which the transfer unit approaches the shaping unit.

Next, in the shaping process, the outline of the winding coil 9 positioned within the stator core 81 is shaped as shown in FIGS. 12, 15, and 16. In the shaping process, the holding portion 52 of the transfer unit 5 is moved to a position facing the shaping unit 4 as shown in FIG. 15, and then the swing arm 51 is made to approach the shaping unit 4, as shown in FIG. 16. The main body portion 41 and the movable shaping portion 42 of the shaping unit 4 are inserted so as to be positioned within the stator hole 810 of the stator core 81 held at the holding portion 52 of the transfer unit 5.

In a state in which the main body portion 41 and the movable shaping portion 42 are positioned within the stator hole 810, as shown in FIG. 12, the movable shaping portion 42 is moved in the outer peripheral direction D1 of the main body portion 41 so that, by means of the movable shaping portion 42, the coil end portions 93 are deformed and made to move in the outer peripheral direction D1 of the stator core 81. Accordingly, the outline of the winding coil 9 positioned within the stator core 81 is shaped, and a new winding coil 9, which is newly formed in the winding unit 2, can be easily inserted into the slots 811 of the stator core 81 in such a manner that the newly formed winding coil 9 overlaps the winding coil 9 previously formed from an inner peripheral side thereof.

After the shaping process, the transfer unit 5, once again holding the stator core 81, can be moved to a position facing the insertion unit 3 and, by moving relative to the insertion unit 3, receive the newly formed winding coil 9. In accordance with a specification of the stator 8 to be formed, the stator manufacturing device 1 can form the winding coil 9 repeatedly in the winding unit 2. The transfer unit 5 can bring the winding coil 9 to a position for insertion into the stator core 81 and shape the winding coil 9 repeatedly.

Figure 17:
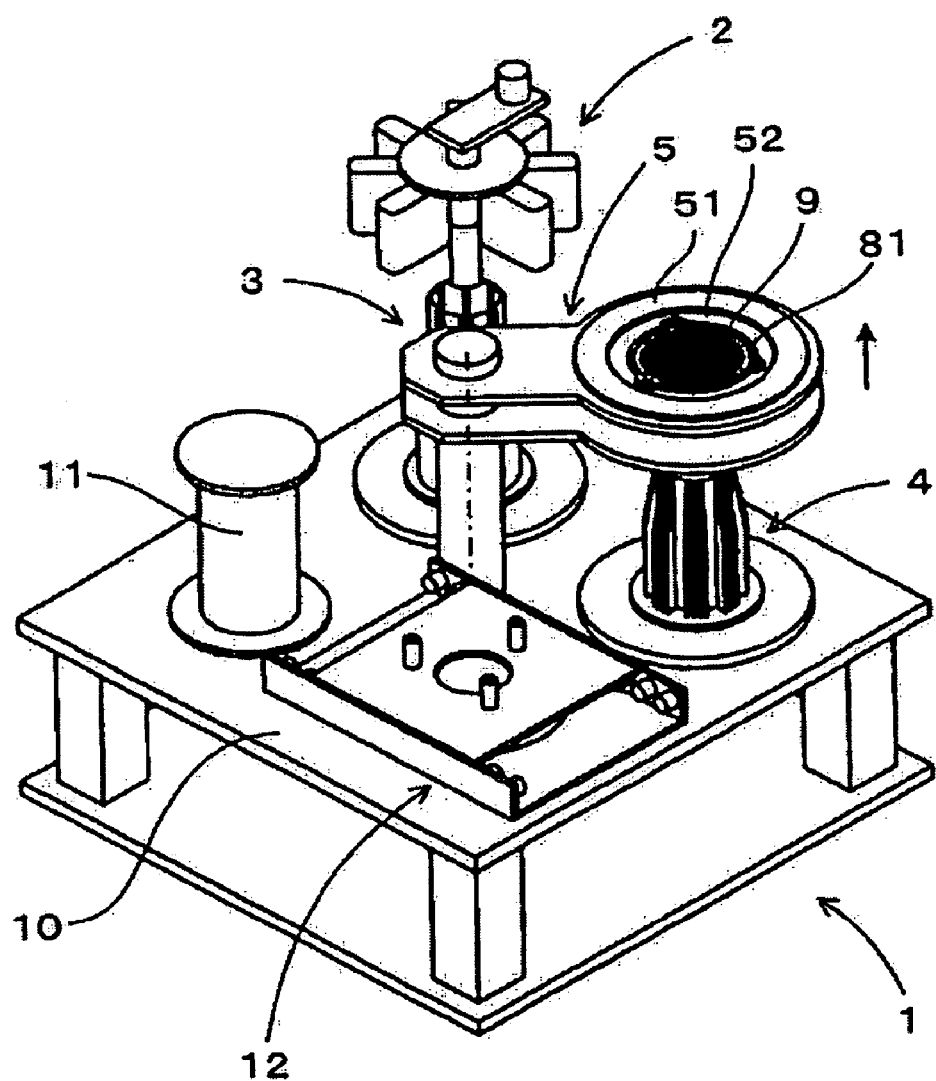
FIG. 17 is a perspective view of the stator manufacturing device in a state in which the transfer unit moves away from the shaping unit.
Figure 18:
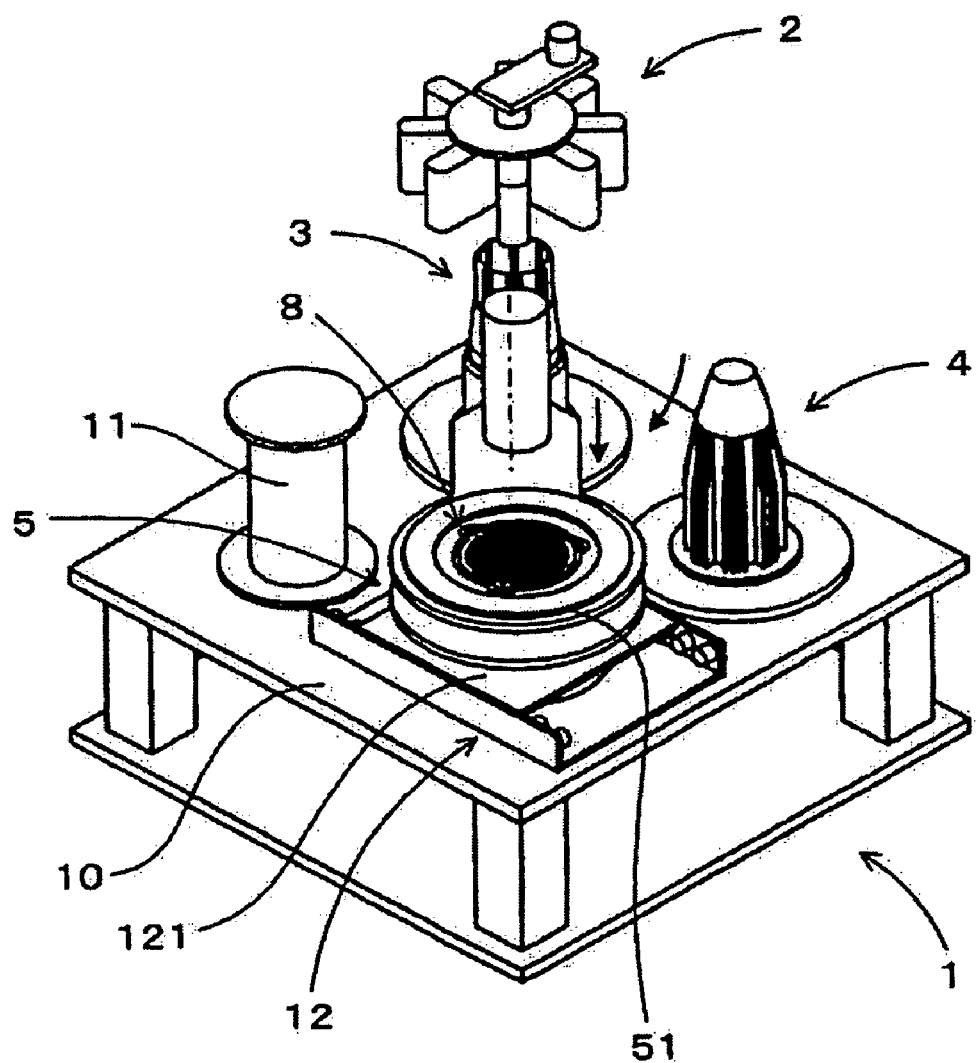
FIG. 18 is a perspective view of the stator manufacturing device in a state in which the transfer unit transports the stator to a transfer conveyer.
Figure 19:
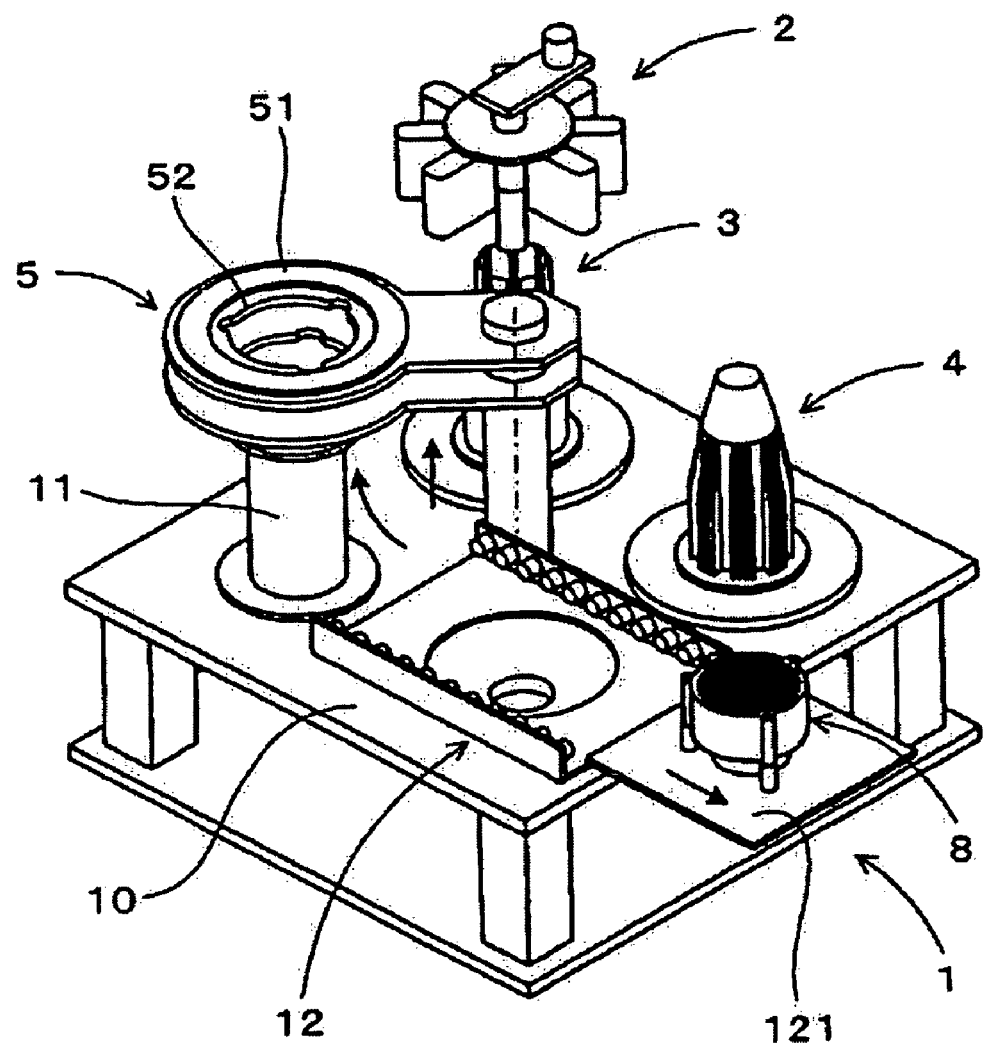
FIG. 19 is a perspective view of the stator manufacturing device in which the transfer conveyer transports the stator to the following process.

As shown in FIGS. 17 and 18, the stator 8 manufactured in the stator manufacturing device 1 is transported by the transfer unit 5 to the pallet 121 of the transfer conveyer 12. Then, as shown in FIG. 19, by moving the pallet 121, the stator 8 can be transported to the next process of the stator manufacturing device 1. According to the exemplary embodiment, wire 90 for forming the winding coil 9 is formed by tying together multiple wires 901 (see FIGS. 3 and 7).

According to the stator manufacturing device 1 of the exemplary embodiment, the stator 8 for a three-phase motor is obtained by inserting into the stator core 81 a winding coil 9 having three phases, a U-phase, a V-phase, and a W-phase, and by repeating the winding process, the handing process, the inserting process, and the shaping process. In more precise terms, a U-phase winding coil 9U is formed by means of a winding process and then inserted into the stator core 81 by means of the handing process and the inserting process. In addition, by means of the shaping process, the coil end portion 93 of the U-phase winding coil 9U positioned within the stator core 81 is deformed and moved in the outer peripheral direction D1 of the stator core 81.

While the U-phase winding coil 9U is subjected to the handing, the inserting, and the shaping processes, a V-phase winding coil 9V is formed using the winding process. Then, the V-phase winding coil 9V is inserted into the stator core 81 by means of the handing process and the inserting process, and then, by means of the shaping process, the coil end portion 93 of the V-phase winding coil 9V, positioned within the stator core 81, is deformed and moves in the outer peripheral direction D1 of the stator core 81.

While the V-phase winding coil 9V is subjected to the handing, the inserting, and the shaping processes, a W-phase winding coil 9W is formed using the winding process. Then, the W-phase winding coil 9W is inserted into the stator core 81 by means of the handing process and the inserting process. The three-phase winding coil 9 of a U-phase, a V-phase, and a W-phase is positioned within the stator core 81 and a stator 8 for a three-phase motor is manufactured.

In the winding unit 2, each U-phase, V-phase, and W-phase winding coil 9 may be formed in multiple stages of implementation. In this case, after the winding coil 9, which is formed over multiple stages, is handed over to the insertion unit 3 after going through the winding and handing processes, the winding coil 9 can be inserted into the stator core 81 by means of the inserting process. In this case, the stator 8 for a three-phase motor can also be manufactured by means of the winding process, the handing process, the inserting process, and the shaping process.

Figure 20:
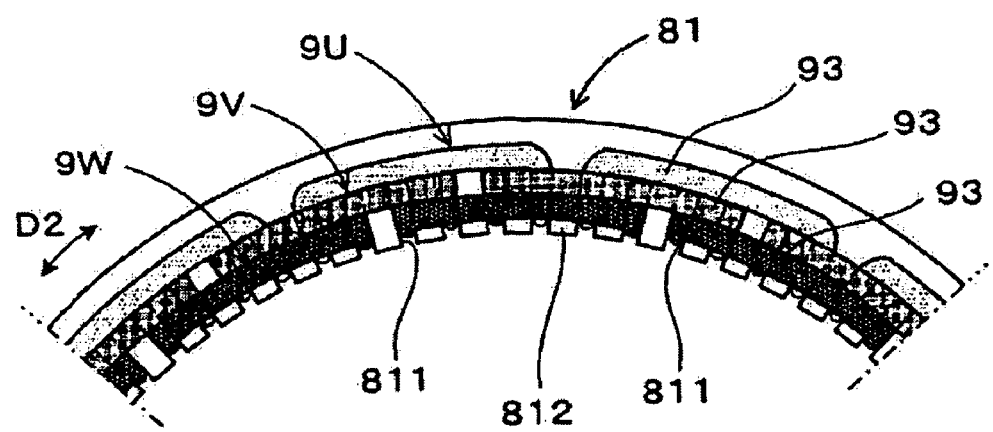
FIG. 20 is a plane view of a stator for a three-phase motor formed by a three-phase winding coil positioned within the stator core.
Figure 21:
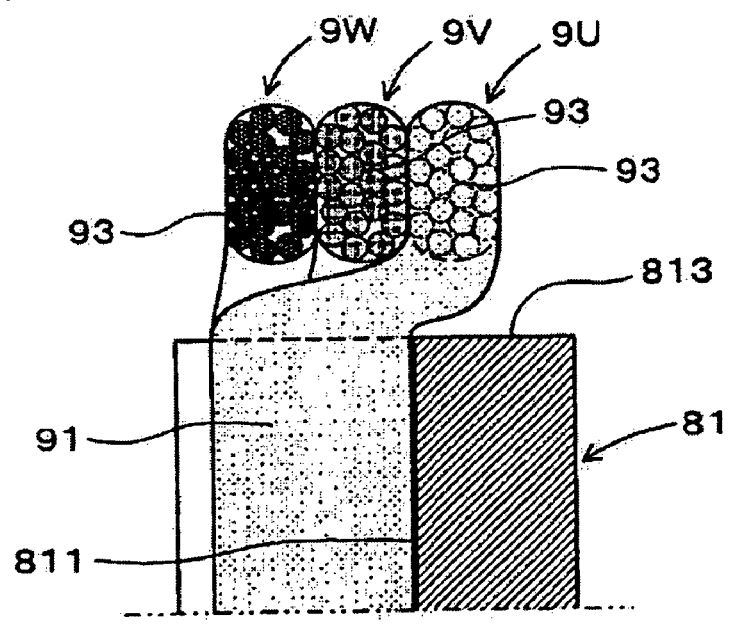
FIG. 21 is a cross-sectional view of the stator for a three-phase motor formed by the three-phase winding coil positioned within the stator core.

As shown in FIG. 20, according to the stator 8 manufactured in the aforementioned manner, each U-phase, V-phase and W-phase winding coil 9 is inserted into the stator core 81 in an offset position through a predetermined number of slots 811 in a circumferential direction D2 of the stator core 81. In addition, as shown in FIG. 21, the respective coil end portions 93, protruding from the axial end portions 813 of the stator core 81, are arranged in the stator core 81 such that the V-phase coil end portions 93 overlap with an inner peripheral side of the U-phase coil end portions 93 while the V-phase coil end portions 93 overlap with an inner peripheral side of the W-phase coil end portions 93.

According to the stator manufacturing device 1 of the exemplary embodiment, the platform 11, the winding unit 2, the insertion unit 3, the shaping unit 4, and the transfer conveyer 12 are integrally arranged on the mounting 10. Further, the transfer unit 5 that can move the holding portion 52 for holding the stator core 81 is provided on the mounting 10. Thus, the winding coil 9 of each phase can be formed and, at the same time, inserted into the stator core 81, thereby consistently manufacturing the stator 8 in the stator manufacturing device 1. The space required for installation of the stator manufacturing device 1 can be reduced in comparison with cases where the units 2 to 5 are separately installed.

Further, according to the aforementioned stator manufacturing device 1, the transfer unit 5 moves the stator core 81 to the insertion unit 3 and the shaping unit 4. Then, the transfer unit 5 is made to approach the insertion unit 3 so that the winding coil 9 can be inserted into the stator core 81. The transfer unit 5 is made to approach the shaping unit 4 so that the winding coil 9 positioned within the stator core 81 can be shaped. Thus, according to the aforementioned stator manufacturing device 1, by means of a transfer unit 5 that can operate with the insertion unit 3 and the shaping unit 4 while holding the stator core 81, the stator 8 can be manufactured within a reduced period of time.

Furthermore, the winding unit 2 can form, independently from the insertion unit 3, a winding coil 9 consisting of multiple unipolar coils 91. In addition, the insertion unit 3 can receive the winding coil 9 from the winding unit 2 and thereafter, by operating with the transfer unit 5, cause the winding coil 9 to be inserted into the stator core 81.

Therefore, after the winding coil 9 is handed over from the winding unit 2 to the insertion unit 3, even while the insertion process is being conducted by the transfer unit 5 and the insertion unit 3, the winding unit 2 can start forming a new winding coil 9, to be inserted next into the stator core 81, by means of the winding process. In addition, the winding unit 2 can continue to form the new winding coil 9 while the transfer unit 5 is moving, or while the shaping process is being conducted by the transfer unit 5 and the shaping unit 4.

According to the stator manufacturing device 1 of the exemplary embodiment, the winding coil 9 can be inserted into the stator core 81 and shaped while a new winding coil 9 is being formed to be inserted into the stator core 81, thereby reducing the time for manufacturing the stator 8.

What is claimed is:

1. A stator manufacturing device, comprising:
   a winding unit that forms a winding coil made up of a plurality of unipolar coils formed by winding wire;
   an insertion unit that receives the winding coil from the winding unit and inserts the winding coil into a stator core;
   a shaping unit that shapes an outline of the winding coil that has been inserted into the stator core; and
   a transfer unit that is movable towards the insertion unit and the shaping unit, wherein, in a state of holding the stator core, the transfer unit, by relatively moving to the insertion unit, moves the winding coil into a position for insertion into the stator core, and, by relatively moving to the shaping unit, forms an outline of the winding coil,
   wherein the transfer unit includes a holding portion for holding the stator core and a swing arm for rotating the holding portion relative to a swing center axis, and the insertion unit and the shaping unit are provided so as to face one another on a swing locus of the holding portion.

2. The stator manufacturing device according to claim 1, wherein when the winding coil is moved into a position for insertion into the stator core, the transfer unit, in a state of holding the stator core, approaches the insertion unit in a state where the insertion unit is holding the winding coil.

3. The stator manufacturing device according to claim 2, wherein, in a state of holding the stator core, the transfer unit approaches the shaping unit at a time when the outline of the winding coil is being shaped.

4. The stator manufacturing device according to claim 3, wherein the winding unit includes a plurality of coil winding bobbins each for forming a unipolar coil by winding wire, and each coil winding bobbin is movably provided on a base holder, one coil winding bobbin of the plurality of coil winding bobbins is selectively made to protrude away from the remaining coil winding bobbins, and the entire winding unit rotated relative to the protruding coil winding bobbin so that each unipolar coil is formed in turn.

5. The stator manufacturing device according to claim 2, wherein the winding unit includes a plurality of coil winding bobbins each for forming a unipolar coil by winding wire, and each coil winding bobbin is movably provided on a base holder, one coil winding bobbin of the plurality of coil winding bobbins is selectively made to protrude away from the remaining coil winding bobbins, and the entire winding unit rotated relative to the protruding coil winding bobbin so that each unipolar coil is formed in turn.

6. The stator manufacturing device according to claim 1, wherein, in a state of holding the stator core, the transfer unit approaches the shaping unit at a time when the outline of the winding coil is being shaped.

7. The stator manufacturing device according to claim 6, wherein the winding unit includes a plurality of coil winding bobbins each for forming a unipolar coil by winding wire, and each coil winding bobbin is movably provided on a base holder, one coil winding bobbin of the plurality of coil winding bobbins is selectively made to protrude away from the remaining coil winding bobbins, and the entire winding unit rotated relative to the protruding coil winding bobbin so that each unipolar coil is formed in turn.

8. The stator manufacturing device according to claim 1, wherein the winding unit includes a plurality of coil winding bobbins each for forming a unipolar coil by winding wire, and each coil winding member is movably provided on a base holder, one coil winding member of the plurality of coil winding bobbins is selectively made to protrude away from the remaining coil winding bobbins, and the entire winding unit rotated relative to the protruding coil winding bobbin so that each unipolar coil is formed in turn.

* * * * *